United States Patent [19]
Nakamura et al.

[11] Patent Number: 5,773,805
[45] Date of Patent: Jun. 30, 1998

[54] CARD PROCESSING APPARATUS

[75] Inventors: Koichiro Nakamura, Yokohama; Yuuji Tutimoto, Kawasaki, both of Japan

[73] Assignee: Kabushiki Kaisha Toshiba, Kawagawa, Japan

[21] Appl. No.: 748,899

[22] Filed: Nov. 14, 1996

[30] Foreign Application Priority Data

Nov. 17, 1995 [JP] Japan ................................. 7-299948
Dec. 26, 1995 [JP] Japan ................................. 7-339399

[51] Int. Cl.$^6$ ................................................. G06K 7/06
[52] U.S. Cl. ......................... 235/441; 235/440; 235/483
[58] Field of Search .................................. 235/441, 440, 235/483

[56] References Cited

U.S. PATENT DOCUMENTS 4,724,310  2/1988  Shimamura et al. .
5,550,361  8/1996  Huis et al. ................................. 235/441

*Primary Examiner*—Harold Pitts
*Attorney, Agent, or Firm*—Cushman Darby & Cushman IP Group of Pillsbury Madison & Sutro LLP

[57] ABSTRACT

An IC card issuing apparatus has a feeding mechanism which feed an IC card supplied form a card supply device along a feeding path. A head body of a head unit has an abutting portion and contact pins. When an IC card is fed along the feeding path, the leading end of the IC card abuts against the abutting portion of the head body and pushes it. By being pushed by the IC card, the head body moves from a standby position to a discharge position through a connect position. In the standby position and discharge position, the contact pins are spaced apart from connect terminals of the IC card, and in the connect position, the contact pins bring into contact with the connect terminals of the IC card.

19 Claims, 10 Drawing Sheets

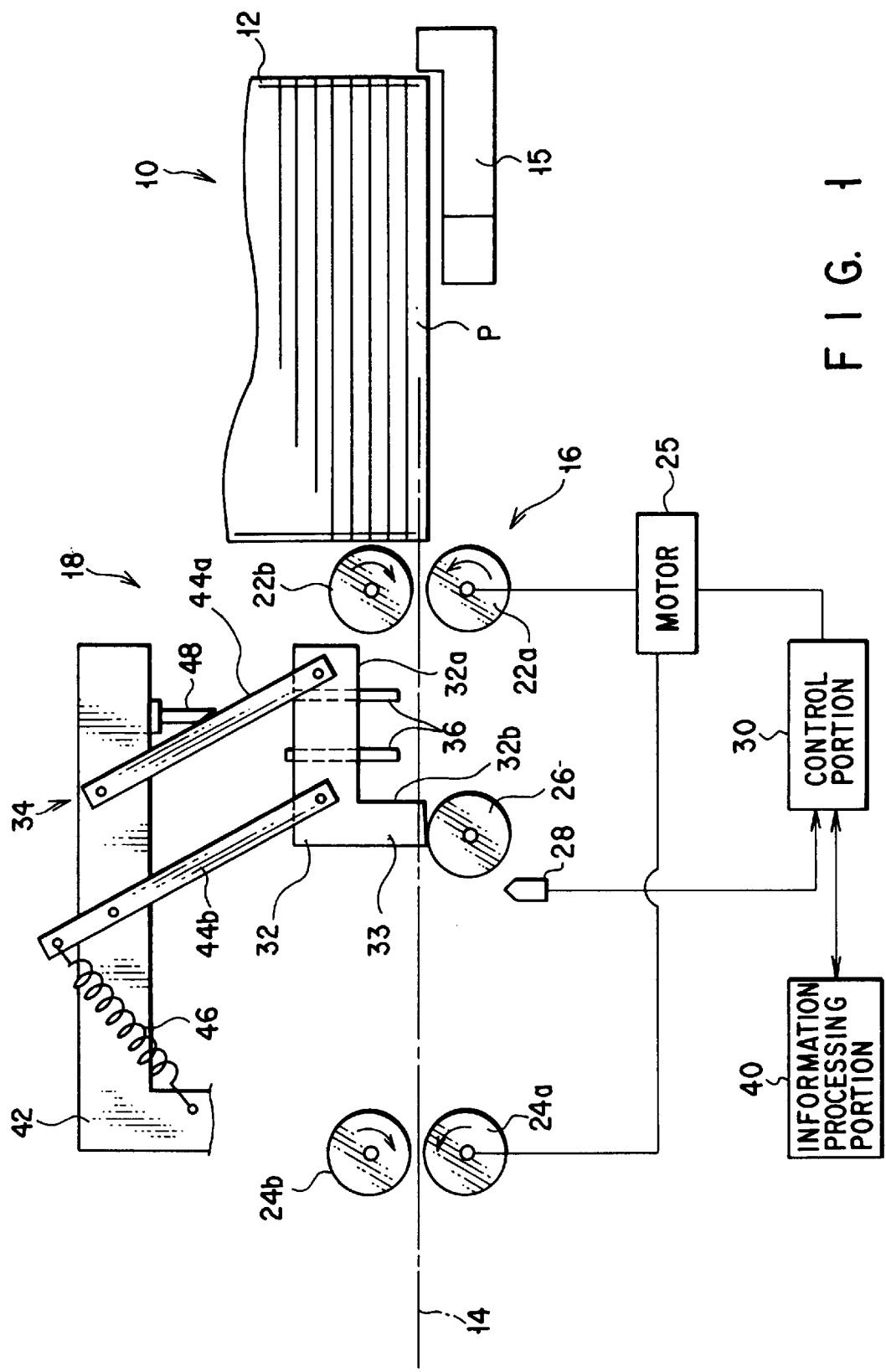
F I G. 1

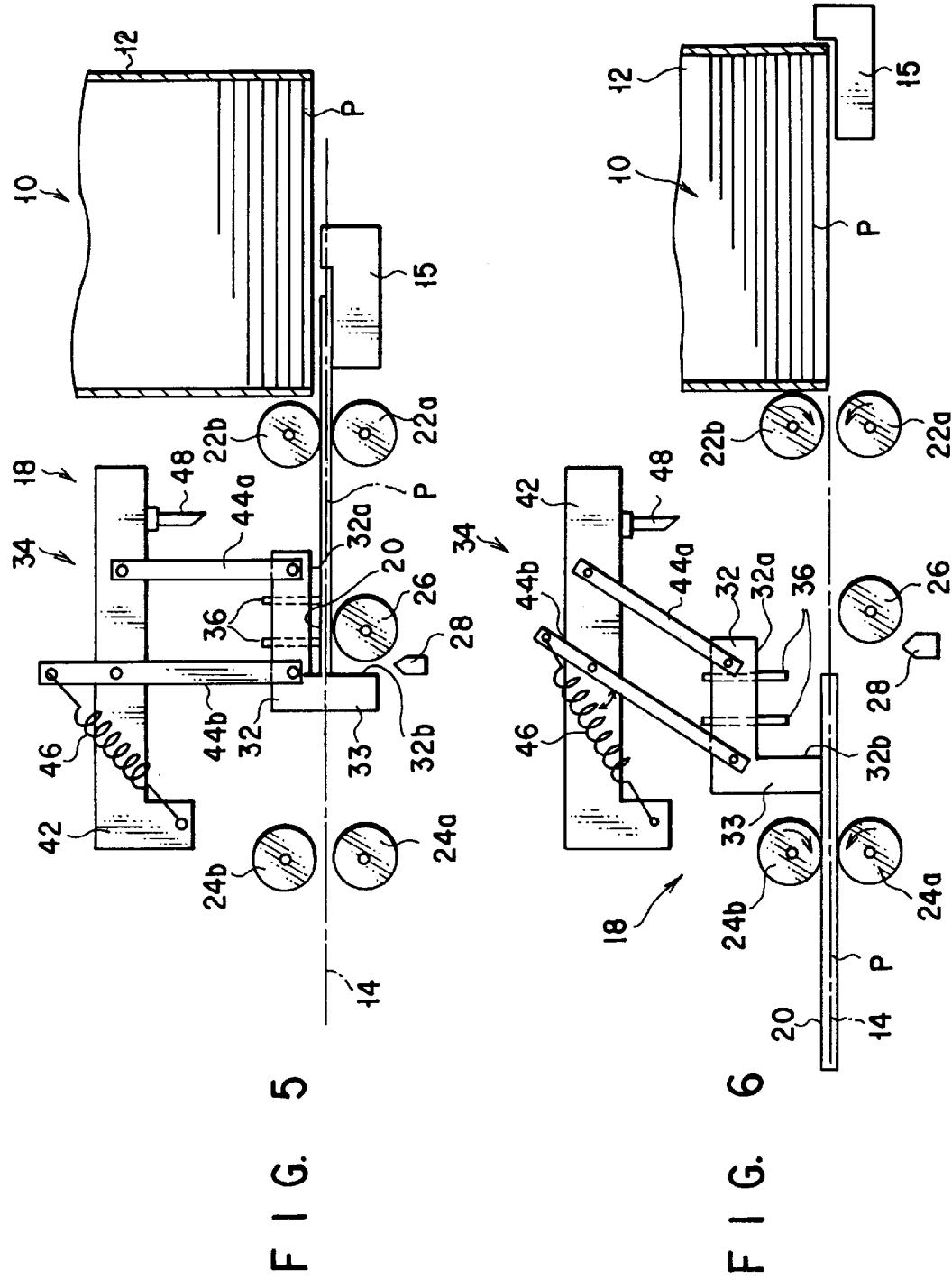

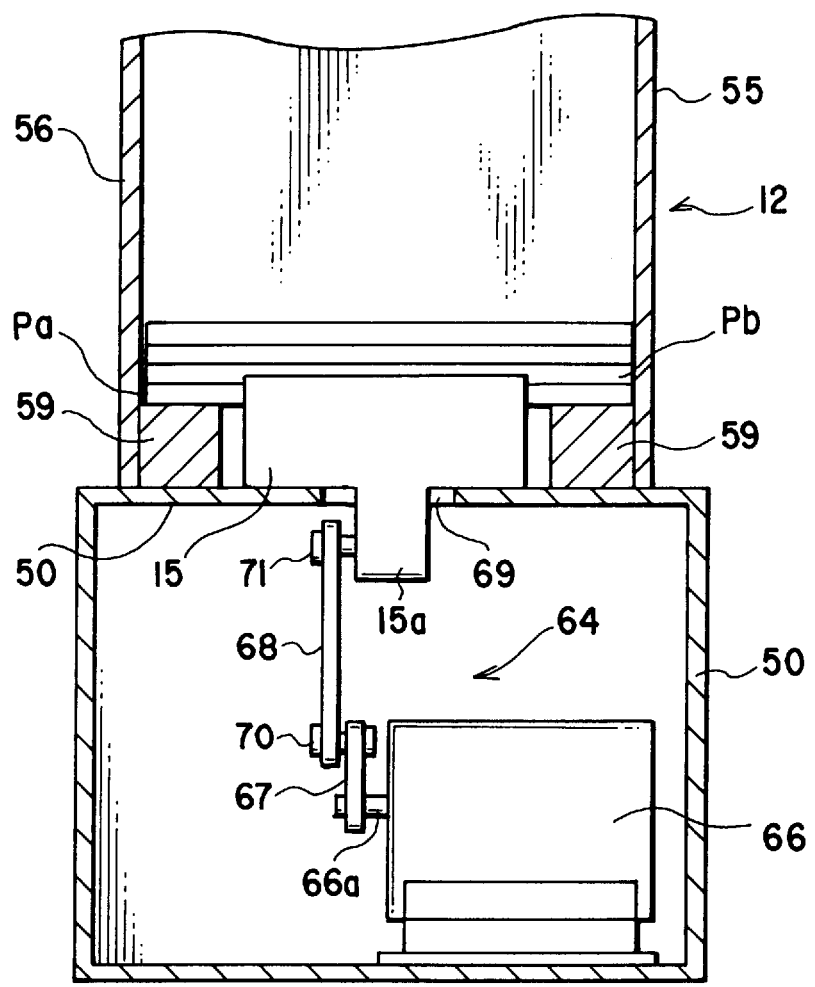
F I G. 10

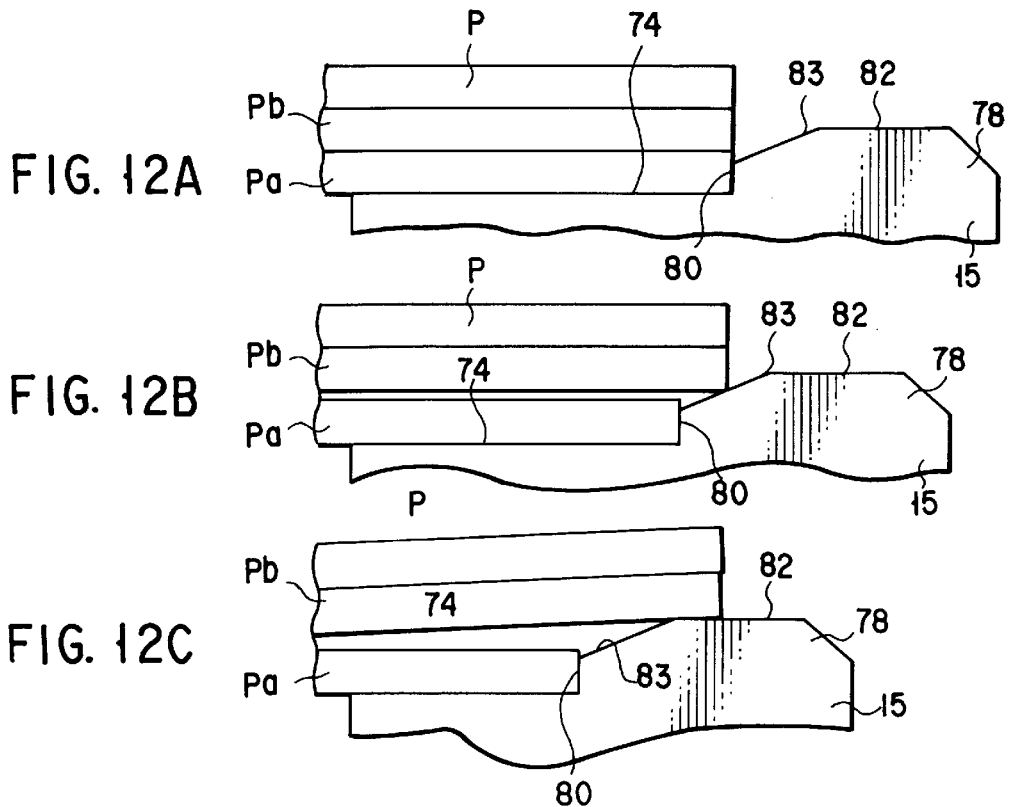
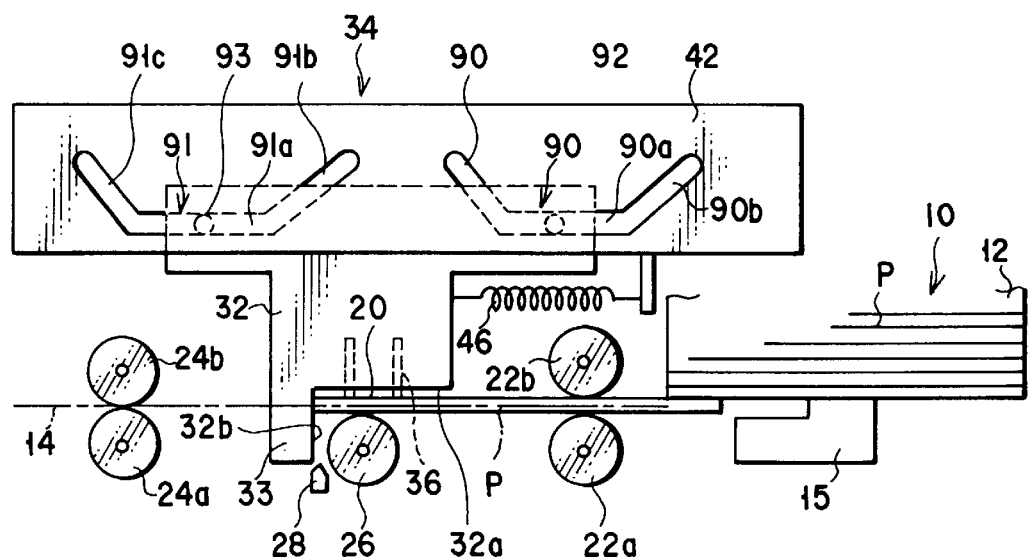

CARD PROCESSING APPARATUS

BACKGROUND OF THE INVENTION

1. Field of the Invention

The present invention relates to a card processing apparatus such as an IC card issuing apparatus which is capable of reading information from and writing information into an IC card.

2. Description of the Related Art

An IC card processing apparatus which is disclosed in U.S. Pat. No. 4,724,310, for example, has a contact head which is pushed to move by an IC card inserted through an insertion port of the apparatus. As the contact head thus moves, a contact pin of the contact head is brought into an electric contact with the IC card, thus enabling communication with the IC card. After communication, the IC card is pushed back by the contact head, and is discharged through the insertion port of the apparatus.

There is another available processing apparatus in which an IC card fed from one side of the apparatus is discharged from the opposite side of the apparatus. This kind of apparatus comprises a drive mechanism for bringing a contact head into contact with the IC card and for separating the contact head therefrom, independently of movements of the IC card. This apparatus is arranged such that the contact head is moved apart from the IC card after the IC card has an electric contact with the contact head, and then, the IC card is further moved forwards and discharged.

However, in this kind of IC card processing apparatus, IC cards are discharged from the side opposite to that side of the apparatus into which cards are fed. Therefore, this apparatus requires a mechanism for making the contact head into contact with IC cards and for releasing the contact head apart from the cards, and a sensor or the like which detects positions of cards, to obtain timings of contact and release. This results in a complication of the structure, an increase in manufacturing cost, and a low reliability.

In addition, this kind of apparatus comprises a card supply device which sequentially supplies cards, one after another, to the contact head. In general cases, a card supply device has a hopper in which a number of IC cards stacked in the vertical direction, and the IC cards are taken out and fed from a feed port at a lower end portion of the hopper one by one. A stage portion is provided below the hopper. The device comprises a card pushing claw which is arranged on the stage portion to be movable in the horizontal direction. The card positioned at the lowest position in the hopper is pushed in the horizontal direction by the card push claw and taken out of the hopper.

In this case, the abutting surface of the card pushing claw, which abuts against the end edge of the card is shaped to have a thickness smaller than that of the card. When the card pushing claw moves horizontally in the direction toward the feed port from an initial position which is opposite to the feed port and to which the claw has once been moved, the cad pushing claw abuts against the end edge of the card at the lowest end, and only this card is pushed out from the feed port to the outside of the hopper.

In this stage, the card is pushed to a predetermined projecting position outside the feed port, by the card pushing claw. Further, the projecting end portion of the card projecting from the feed port is caught with feed rollers or the like, and is then discharged from the hopper.

Meanwhile, the entire weight of all the remaining cards which are stacked on the lowest card acts on this card, and therefore, the lowest card receives a larger weight as the number of the remaining cards in the hopper is larger. If the number of the remaining cards layered on the card at the lowest end is large, the lowest card receives a large resistance when the card discharged and projecting from the feed port to the outside of the hopper is caught with the feed rollers or the like and is drawn out of the hopper. Thus, it is difficult to carry out the drawing operation of the card from the hopper.

If the number of the remaining cards stacked in the hopper is so large that the card at the lowest end receives a heavy weight, the upper surface of the card to be discharged rubs against the lower surface of a card layered thereon, and therefore, both the contact surfaces of the upper and lower cards may be damaged.

In order to solve the problems as described above, the number of the cards stored in the hopper must be reduced or the entire card at the lowest end in the hopper must be completely discharged out of the hopper when the card is discharged.

In the former case, however, the number of cards to be stacked in the hopper for one card charge service is small so that charge services must be carried out at a higher frequency and are thus troublesome. In the latter case, the movement stroke of the card pushing claw must be enlarged so that the entire size of the mechanism for moving the card pushing claw must be enlarged.

SUMMARY OF THE INVENTION

The present invention has been made in view of the above circumstances, and its object is to provide a card processing apparatus which is capable of bringing a contact element of a contact head into contact with a card and making the element apart therefrom, without requiring any particular drive mechanism.

Further, another object of the present invention is to provide a card processing apparatus which is capable of bringing a contact element of a contact head into contact with a card and making the element apart therefrom, with a simple structure, and in which the size of the entire apparatus is reduced, an operation of discharging a card out of a hopper is easily achieved, and cards are less damaged when cards are discharged.

In order to achieve the above objects, a card processing apparatus according to the present invention comprises: card supply means for sequentially supplying a card having a connect terminal; feeding means for feeding the card supplied from the card supply means, along a predetermined feeding path; a head unit including an abutting portion capable of abutting against a leading end of the card being fed by the feeding means, and a contact element for bringing in contact with the connect terminal of the card, the head unit being arranged to be movable between a standby position in which the abutting portion is located in the feeding path and the contact element is apart from the feeding path, a connect position in which the abutting portion is located in the feeding path and the contact element brings in contact with the connect terminal of the card being fed so as to perform predetermined information processing on the card, and a discharge position in which the abutting portion and the contact element are moved apart from the feeding path, such that the abutting portion is pushed by the leading end of the card being moved along the feeding path and the head unit is moved from the standby position to the discharge position through the connect position; and means for returning the head unit from the discharge position to the standby position.

According to the card processing apparatus, when a card is fed by the feeding means, the leading end of the card is brought into contact with the abutting portion of the head unit, and the head unit pushed by the card moves from the standby position to the connect position, and then to the discharge position, together with this card. Therefore, the head unit is moved by the force for feeding the card and the contact element of the head unit is thus electrically connected or disconnected with the contact terminal of the card, without using any independent drive source. Further, in the connect position, information processing is performed on the card by the head unit.

In addition, according to a card processing apparatus of the present invention, the card supply means comprises a hopper storing a plurality of stacked cards and having a lower end portion formed with a card outlet port which allows only a lowest card to pass through; card pushing means having a card pushing portion with a thickness smaller than a thickness of each of the stacked cards, for pushing out the lowest card in the hopper through the card outlet port; and card support means provided on the card pushing means, for supporting cards other than the card pushed out by the card pushing portion, which remain in the hopper, during the card push portion pushes the card.

According to the structure as described above, the cards remaining in the hopper other than the one being pushed out is supported by the card support means while the lowest card is pushed out by the card pushing portion. Thus, the entire weight of the remaining cards layered on the lowest card being pushed out is prevented from acting on the lowest card being pushed. As a result of this, the resistance generated when the pushed card is drawn from the hopper can be reduced.

In addition, according to the present invention, the card support means comprises a card support portion provided on the card pushing means and positioned at a level higher than at least the thickness of the lowest card in the hopper, and a slanting surface connecting a top position of the pushing portion and the card support portion.

According to this structure, while a card is pushed out, the cards remaining in the hopper other than the one being pushed out are smoothly guided onto the card support portion by the slanting surface provided between the card pushing portion and the card support portion.

Further, according to the present invention, the card support portion is positioned at a level lower than a thickness of two cards, one of which is the lowest card in the hopper and another one of which is a card layered thereon.

In this case, even if the lowest card is applied with a force which acts to move the card off the card pushing portion, the lowest card is brought into contact with the remaining cards supported by the card support portion, thereby preventing the lowest card from being completely moved apart from the card pushing portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 12C show a card issuing apparatus according to a first embodiment of the present invention, in which:

FIG. 1 is a side view schematically showing the entire card issuing apparatus,

FIG. 2 is a perspective view showing an IC card treated by the card issuing apparatus, FIG. 3 is a perspective view showing a head body of the apparatus, FIG. 4 is an enlarged cross-sectional view showing a connect pin of the head body, FIG. 5 is a side view of the apparatus where the head body has been moved to a connect position, FIG. 6 is a side view of the apparatus where the head body has been moved to a discharge position, FIG. 7 is a cross-sectional view showing a card supply device of the apparatus, FIG. 9 is a perspective view showing the bottom surface of an upper gate of the card supply device.

FIG. 10 is a cross-sectional view of the card supply device, viewed from the rear side, FIG. 11 is a cross-sectional view of the card supply device in a state where a pusher has been moved to a pushing position, and FIGS. 12A to 12C are enlarged views of a pusher and an IC card, each showing an operation of pushing an IC card;

FIG. 13 is a cross-sectional view schematically showing a card issuing apparatus according to a second embodiment of the present invention;

DETAILED DESCRIPTION OF THE PREFERRED EMBODIMENTS

Figure 2:
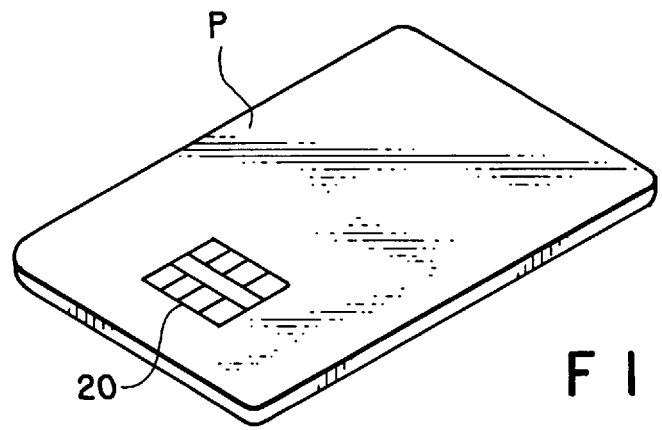

An IC card issuing apparatus according to an embodiment of the present invention will now be described in detail with reference to the accompanying drawings.

Explained at first will be the structure of the entire apparatus. As shown in FIG. 1, the card issuing apparatus comprises a card supply device 10 which supplies IC cards, one after another, by means of a pusher 15 from a hopper 12 storing IC cards P stacked therein, a feeding mechanism 16 which feeds a supplied IC card along a linear feeding path 14, and a head unit 18 which writes information into the IC card and reads information therefrom.

Each of IC cards P stored in the card supply device 10 is formed in a rectangular shape, as shown in FIG. 2, and has an IC chip (not shown) internally included near the top end of the card. A plurality of connect terminals 20 connected to the IC chip are exposed on the upper surface of the card P. The structure of the card supply device will be specifically described later.

As shown in FIG. 1, the feeding mechanism 16 includes paired feed rollers 22a and 22b, paired feed rollers 24a and 24b, and a drive motor 25 for driving the feed rollers. Each pair of these rollers face each other with the feeding path 14 interposed therebetween. The pairs of rollers 22a, 22b and 24a,24b are disposed along the feeding path 14 with a predetermined interval, particularly, with a distance slightly shorter than the length of the IC card P. A back-up roller 26 is provided between the two pairs of feed rollers, and is positioned below the feeding path 14.

Further, an IC card P supplied from the card supply device 10 is conveyed along the feeding path 14, with being sandwiched between the pair of feed rollers 22a and 22b and between the pair of feed rollers 24a and 24b. While being conveyed, the IC card P moves over the back-up roller 26.

In the vicinity of the back-up roller 26, there is provided a card sensor 28 for detecting arrival of an IC card P. This card sensor 28 and the drive motor 25 are connected to a control portion 30. The control portion 30 stops the drive motor 25 to stop the movement of the IC card P, when the control portion 30 receives a detection signal from the card sensor 28, i.e., when the portion 30 detects an IC card which has arrived at a predetermined connect position described later. Further, when the control portion 30 receives an information processing completion signal with respect to an IC card, the control portion 30 actuates the drive motor 25 to rotate the pairs of feed rollers 22a, 22b, 24a, and 24b, so that the IC card P is further conveyed.

Above the back-up roller 26 is provided a head unit 18 for writing information into an IC card P and reading information therefrom. The head unit 18 comprises a head body 32 having an L-shaped cross-section, and a support mechanism 34 movably supporting the head body 32.

Figure 3:
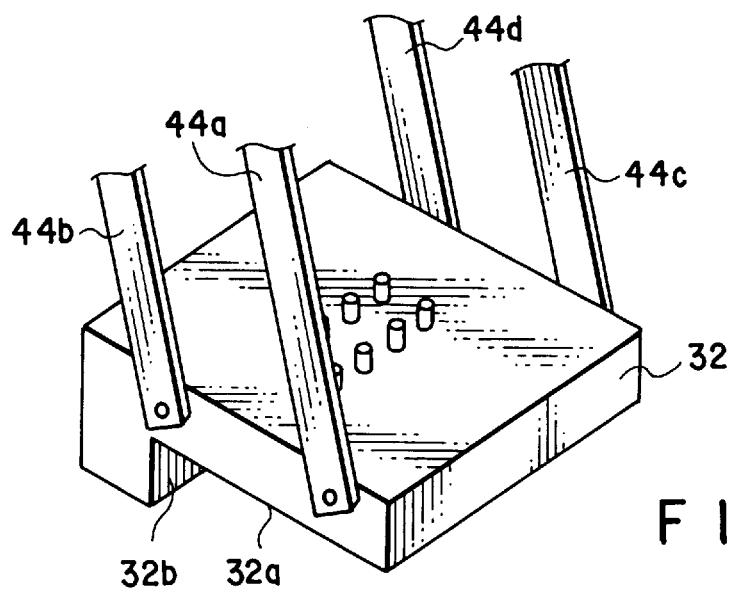
Figure 4:
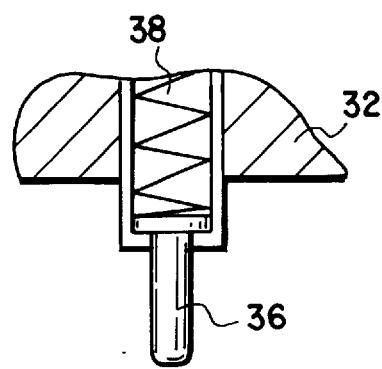

As shown in FIGS. 1, 3, and 4, the head body 32 includes a lower surface 32a facing and extending in parallel with the feeding path 14, a projecting portion 33 projecting from the lower surface 32a toward the feeding path 14, and a abutting surface 32b formed on the projecting portion and extending at right angles to the feeding path 14. In addition, the head body 32 has a plurality of contact pins 36 projecting at right angles from the lower surface 32a toward the feeding path 14.

Each of the contact pins 36 is arranged such that it can freely project and retract in a direction perpendicular to the feeding path 14, and is urged in the projecting direction by a compression spring 38. The contact pins 36 are connected to the control portion 30 thorough an information processing portion 40.

Meanwhile, the support mechanism 34 includes a support frame 42 provided above the head body 32 and four support arms 44a to 44d for supporting the head body 32 on the support frame 42 to be rotatable with respect to the support frame 42.

Each of the support arms 44a to 44d has an end rotatably connected to the head body 32, and another end rotatably connected to the support frame 42. Besides, the support arms 44a to 44d are arranged in parallel with each other, thereby constituting a link mechanism.

Therefore, the head body 32 is supported to be movable an arcuated movement path crossing the feeding path, between a standby position shown in FIG. 1, a connect position shown in FIG. 5, and a discharge position shown in FIG. 6.

In the standby position, the abutting surface 32b of the head body 32 is positioned in the feeding path 14, and the contact pins 36 are located apart from the feeding path 14. In the connect position, the abutting surface 32b of the head body 32 is positioned in the feeding path 14, and the contact pins 36 are also positioned on the feeding path 14, so that the pins 36 can be brought into contact with the contact terminals 20 of an IC card P. In the discharge position, the abutting surface 32b of the head body 32 and the contact pins 36 are positioned apart from the feeding path 14, respectively.

A tension spring 46 serving as returning means is stretched between the support frame 42 and an end of one of four support arms 44a to 44d, for example, the support arm 44b. The head body 32 is urged toward the standby position, by the tension spring 46. In addition, the support frame 42 is equipped with a stopper 48. Therefore, while the apparatus is not operating, the head body 32 is maintained at the standby position and kept in contact with the stopper 48, by the tension spring 46.

When issuing IC cards P, the pusher 15 of the card supply device 10 moves forwards and supplies IC cards P into the feeding path 14, one after another. At the same time, the pairs of feed rollers 22a and 22b as well as 24a and 24b are driven by the motor 25. In this state, the head body 32 is maintained at the standby position.

An IC card P thus supplied is fed forwards, held between the pair of feed rollers 22a and 22b. Accordingly, the leading end of the card P passes below the contact pins 36 which are in a projecting state (or an extended state) and abuts against the abutting surface 32b of the head body 32. When the IC card P is further conveyed forwards, the head body 32 is pushed by the IC card P and moves forwards, as shown in FIG. 5. The support arms 44a to 44d are rotated in the clockwise direction against the urging force of the tension spring 46, and the head body 32 comes close to the IC card, with the lower surface 32a of the head body 32 kept in parallel with the feeding path 14, i.e., in parallel with the IC card P.

At the time when the leading end of the IC card P is detected by the card sensor 28, the control portion 30 stops drive of the drive motor 25, and makes the IC card P kept stopped at the contact position shown in FIG. 5. In this while, the head body 32 moves from the standby position to the connect position, and stops at the connect position as the IC card P stops. At the connect position, the head body 32 is closest to the feeding path 14, i.e., to the IC card P. Here, the lower ends of the contact pins 36 of the head body 32 are brought into contact the respective contact terminals 20 of the IC card P, thereby making an electric contact therebetween. In this state, each of contact pins 36 is pushed upwards against the compression spring 38, and generates a contact pressure sufficient for maintaining the electric contact with the contact terminal 20.

In this state, also, the IC card P is supported on its lower surface by the back-up roller 26, and is thereby prevented from being deformed due to a pressure from the contact pins 36. In this state, reading or writing of information on the IC card P is carried out through the contact pins 36 and the contact terminals 20 by the information processing portion 40. When information communication between the information processing portion 40 and the IC card P is completed, a completion signal is supplied from the information processing portion 40 to the control portion 30, and the control portion 30 actuates the drive motor 25 to rotate the feed rollers 22a, 22b, 24a, and 24d, thereby moving the IC card P forwards.

Here, the lower surface 32a of the head body 32 is continuously kept in parallel with the IC card P, and the abutting surface 32b of the head body is continuously kept pressed against the leading end of the IC card by the tension spring 46. Therefore, each of contact pins 36 can contact with the corresponding connect terminal 20 of the IC card P at a constant position until this contact is released since this contact begins. In this manner, the contact portions of the IC card P with respect to the contact pins 36 are prevented from being damaged.

Since the contact pins 36 freely project and retract within a predetermined stroke, each pin can maintain a sufficient electric contact with the corresponding connect terminal 20 of the IC card P even when the IC card P is not stopped accurately at the contact position (e.g., even when the card stops more or less shifted forwards or backwards).

As the IC card P moves, the head body 32 is pushed by the IC card and moved toward the discharge position, as shown in FIG. 6. As a result, the support arms 44a to 44d are further rotated in the clockwise direction against the urging force of the tension spring 46, and the head body 32 is moved upwards apart from the IC card P, with its parallel relationship maintained with respect to the IC card P. Accordingly, the contact pins 36 are spaced apart from the contact terminals 20 of the IC card P.

As the IC card P further moves forwards, the head body 32 is moved to the discharge position shown in the figure, and the lower end of the projecting portion 33 of the head body 32 is moved upwards off from the leading end of the IC card P. As a result, the IC card P passes below the head body 32 and moves to the discharge port side. Here, the lower end of the projecting portion 33 slides on the upper surface of the IC card P. However, since the angle A between the tension spring 46 and the support arm 44b is decreased to be small, the urging force with which the projecting portion 33 pushes the IC card P is also decreased, so that the IC card is prevented from being damaged.

Thereafter, the IC card P is conveyed forwards, kept between the feed rollers 24a and 24b, and is then discharged from the apparatus. In other words, the IC card P is issued. When the rear end of the IC card P passes below the projecting portion 33 of the head body 32, the head body 32 is returned back to the standby position by the tension spring 46.

In the next, the structure and operation of the card supply device 10 will be specifically described.

As shown in FIGS. 7 and 8A to 8C, the card supply device 10 comprises a base 50 and a hopper 12 mounted on the base. The hopper 12 has a rectangular front plate 53, a rectangular rear plate 54, and a pair of left and right side plates 55 and 56. The hopper 12 as a whole is formed in a substantially square pillar shape. A plurality of IC cards P are stored in the hopper 12, with being stacked in the vertical direction.

A card outlet port 58 which allows only one IC card 7 to pass through is provided at a lower end portion of the hopper 12. The card outlet port 58 is formed at the lower end portion of the front plate 53. Rails 59 are respectively fixed at lower ends on the inner surfaces of the side plates 55 and 56, and extend in parallel with each other.

A flat stage 60 extending horizontally is provided on the base 50. The hopper 12 is mounted on the base 50, with the rails 59 set on the stage 60. In addition, a lower gate 61 and an upper gate 62 are layered and provided on the stage 60, so as to face the card outlet port 58. The upper gate 62 is arranged in contact with the lower end portion of the front plate 53, and the lower gates 61 is arranged in contact with the front end portions of the rails 59.

Figure 7:
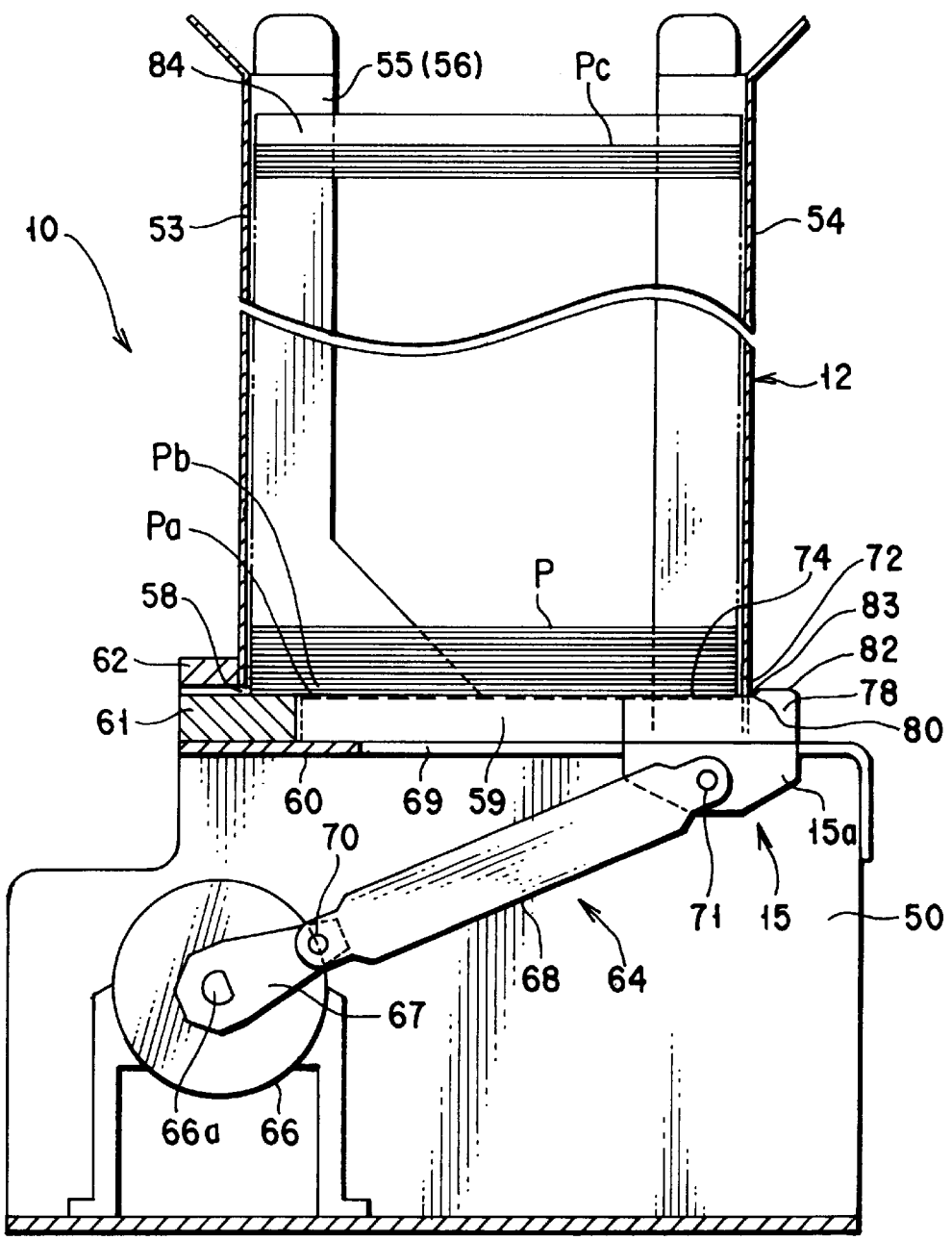
Figures 8A, 8B:
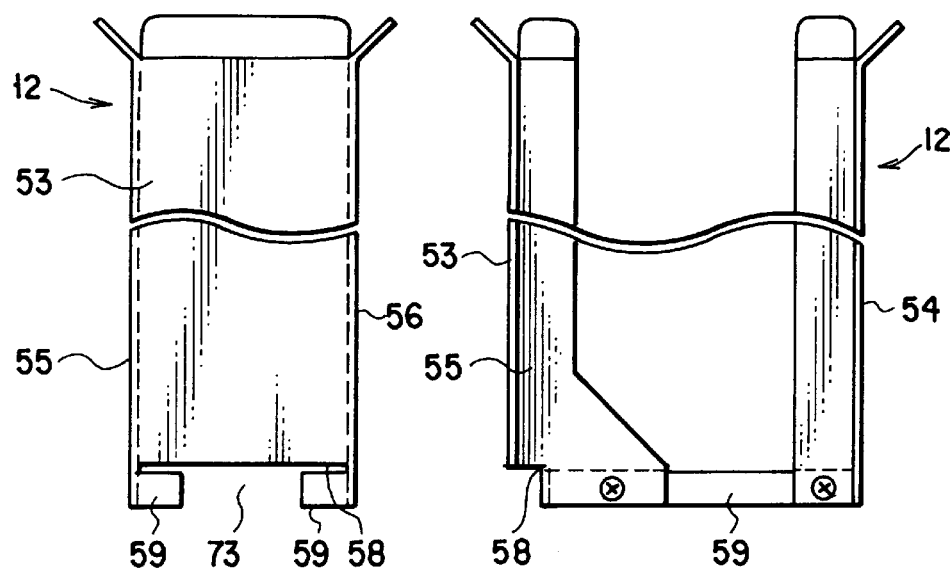
FIGS. 8A to 8C are front, side, and rear views of a hopper of the card supply device.
Figure 8C:
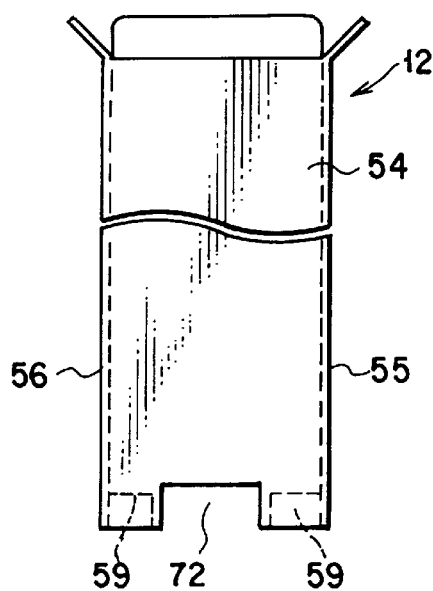
Figure 9:
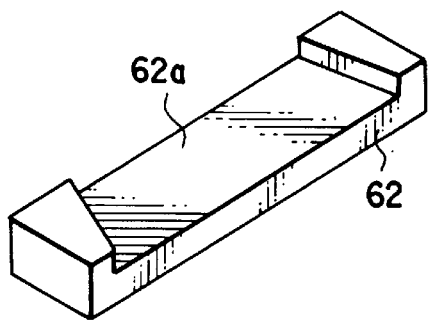

As shown in FIGS. 7 and 9, a guide groove 62a is formed in the lower surface of the upper gate 62, and a discharge path communicating with the card outlet port 58 of the hopper 12 is defined by the guide groove 62a.

As shown in FIGS. 7 and 10, a card pushing mechanism 64 is provided in the base 50 and serves as card pushing means. The card pushing mechanism 64 includes a pusher 15 for pushing out an IC card Pa, layered at the lowest position among the stacked IC cards P, toward the card outlet port 58, a drive motor 66, and crank rods 67 and 68 for transmitting the driving force of the drive motor 66 to the pusher 15.

The pusher 15 is arranged on the upper surface of the stage 60 to be slidable between the pair of rails 59. A liner guide hole 69 is formed in the stage 60 between the pair of rails 59, so as to extend in parallel with these rails. The pusher 15 has a coupling portion 15a penetrates through the guide hole 69 and projects into the base 50. This coupling portion 15a moves in the guide hole 69 as the pusher 15 moves. Further, the pusher 15 is moved in the left and right directions in FIG. 7, between an initial position wherein the pusher 15 is moved to a movement limit position in the rear side of the rear surface plate of the hopper 12, as shown in FIG. 7, and a card push position wherein the pusher is located at substantially a middle portion of the hopper 12, as shown in FIG. 11.

An end of the crank rod 67 is fixed to a rotation shaft of the drive motor 66. The other end of the crank rod 67 is rotatably connected with an end of another crank rod 68, by a first connect pin 70. The other end of the crank rod 68 is rotatably connected with the coupling portion 15a of the pusher 15, by a second connect pin 71. When the drive motor 66 is driven, the pusher 15 is slid in the lateral direction (in the figure) on the stage 16 by the crank rods 67 and 68. Here, the pusher 15 reciprocates between the initial position and the card push position, as the drive motor 66 is rotated by one turn.

Note that a passage hole 72 is formed in the substantial center of the lower end portion of the rear plate 54 of the hopper 12. The passage hole 72 communicates with a pusher path 73 defined between the left and right rails 59.

Figure 11:
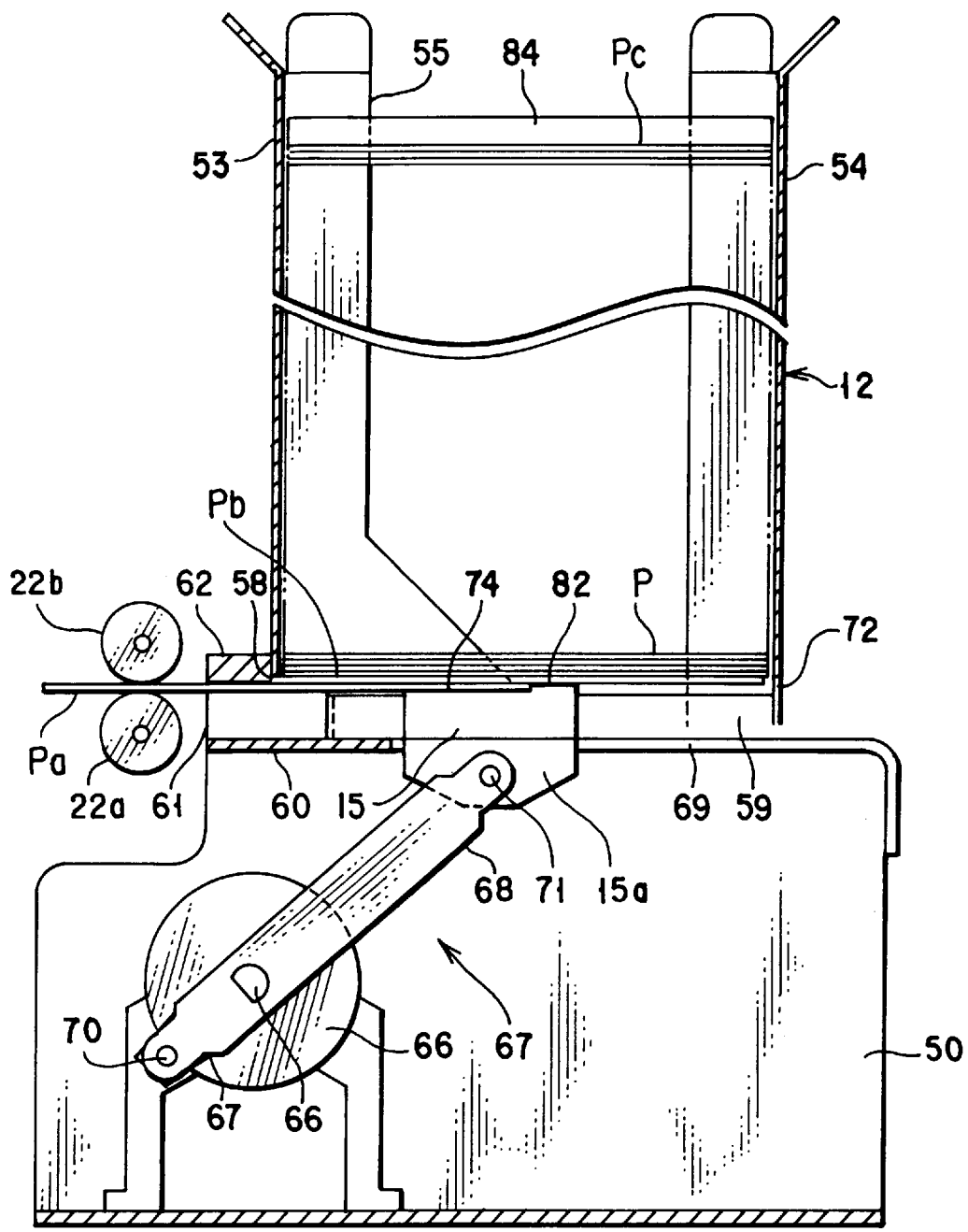

As shown in FIGS. 11 and 12A, the pusher 15 is formed in a substantially rectangular prism having a height substantially equal to that of the rails 59 and a width substantially equal to that between the pair of rails 59. A flat first stage 74 extending in parallel with the stage 60 is formed on the front half of the upper surface of the pusher 15. Where the pusher 15 is positioned in the initial position, a rear end portion of the IC card Pa at the lowest end in the hopper 12 is supported on the stage 74, and a front end portion of the card Pa is received by the lower gate 61. As a result, the IC card Pa is kept apart from the rails 9.

In addition, a projecting portion 78 projecting upwards over the first stage 74 is formed on the rear end portion of the upper surface of the pusher 15. A pushing surface 80 continuing to the first stage 74 and extending at right angles to the first stage 74 is formed at the front end of the projecting portion 78 which serves as card support means. The pushing surface 80 is formed to have a height lower than the thickness of the IC card P.

A flat second stage 82 is formed on the upper surface of the projecting portion 78 and is positioned at a level at least higher than the thickness of the IC card Pa at the lowest end in the hopper 12.

In particular, the height of the second stage 82 is lower than a thickness equivalent to two IC cards layered on the first stage 74. In other words, the second stage 82 is provided so as to have a height lower than the total of the thickness of the lowest IC card Pa and the thickness of a second IC card Pb layered thereon. Further, a slanting surface 83 is formed on the projecting portion 78 between the pushing surface 80 and the second stage 82 such that the height of the slanting surface 83 gradually increases from the upper end of the pushing surface 80 to the front end of the second stage 82.

The height of the card path formed between the upper gate 62 and the lower gate 61 installed on the stage 60 of the base 50 is set to a dimension which is equal to or greater than the thickness of one IC card and which is smaller than the thickness of two IC cards. In addition, the height of the card outlet port 58 of the hopper 12 is set to a size which is equal to or greater than the thickness of one IC card and which is smaller than the height of the upper gate 61. As shown in FIG. 7, a weight 84 of an appropriate weight is set on the IC card Pc positioned at the uppermost end layer of the stacked IC cards P contained in the hopper 12.

The operation of the card supply device 10 constructed as described above will be explained. While the card issuing apparatus is not operated, the pusher 15 is maintained in the initial position where the pusher 15 has been moved to the movement limit position in the rear side of the rear plate 54 of the hopper 12. In this state, the hopper 12 storing a plurality of IC cards P stacked is set on the stage 60 on the base 50. Here, the IC cards P contained in the hopper 12 are received by the lower gate 61 and the first stage 74 of the pusher 15, and are kept apart from rails 59.

In a case where IC cards P are fed from the hopper 12 by the card supply device 10, the drive motor 66 is driven under control by the control portion 30 (shown in FIG. 1). When the crank rod 67 is rotated by the drive motor 66, the connect portion (i.e., a first connect pin 70) between the crank rods 67 and 68 is rotated around the rotation shaft 66a of the drive motor 66. As a result of this, the pusher 15 is pulled by the crank rod 68, and starts sliding along the upper surface of the stage 16 from the initial position toward the card outlet port 58. The pusher 15 moves passing through the passage hole 72 of the hopper 12.

When the pusher 15 moves as shown in FIG. 12A, the pushing surface 80 of the pusher 15 abuts against the rear end of the IC card Pa at the lowest end in the hopper 12, and pushes out the card Pa in the direction toward the card outlet port 58. In this case, since the pushing surface 80 is lower than the thickness of one IC card P, the pusher 15 moves in the direction toward the card outlet port 58, pushing only the lowest IC card Pa by the pushing surface 80.

Further, the pusher 15 moves from the initial position to the pushing position, so that only the IC card Pa at the lowest end is pushed out of the hopper 12 from the card outlet port 58 of the hopper 12, through the card path between the upper and lower gates 62 and 61. Here, in several cases, the second IC card Pb on the lowest IC card Pa is moved in the direction toward the card outlet port 58, together with the lowest IC card Pa, due to a friction or the like generated as the IC card Pa moves. However, since the height of the card path between the upper and lower gates 62 and 61 is set to a size which is equal to or greater than the thickness of one IC card P and which is smaller than the thickness of two IC cards P, the second IC card Pb cannot pass the card path and is thus prevented from being pushed out of the hopper 12. Therefore, the second IC card Pb is kept in contact with the side plates 55 and 56 of the hopper 12 or the upper gate 62, thereby restricting movement of the second card, so that only the IC card Pa at the lowest end can be pushed out from the card outlet port 58.

In addition, while the pusher 15 moves from the initial position to the push position, the second IC card Pb layered on the lowest IC card Pa is brought into contact with the slanting surface 83 of the pusher 15, as shown in FIG. 12B, and thereafter, the second card Pb is lifted upwards along the slanting surface 83. Then, the second IC card Pb is supported, laid partially on the second stage 82 of the pusher 15, as shown in FIG. 12C. While the pusher 15 pushes the lowest IC card Pa, the remaining IC cards P other than the IC card Pa are supported by the second stage 82.

Since the height of the second stage 82 of the pusher 15 is greater than the thickness of one IC card P set on the first stage 74 and is smaller than the thickness of two IC cards P, the clearance between the IC card Pa on the first stage 74 and the IC card Pb on the second stage 82 is smaller than the thickness of one IC card P. Therefore, even when the IC card Pa at the lowest end is applied with an external force which serves to move the IC card Pa off from the pushing surface 80, the IC card Pa is brought into contact with the IC card Pb and is thereby prevented from moving. Thus, the IC card Pa is prevented from being moved completely apart from the pushing surface 80.

At the time point when the pusher 15 is moved to the vicinity of the pushing position shown in FIG. 11 which is the movement limit position in the direction toward the card outlet port 58, the leading end portion of the IC card Pa, pushed out by the pusher 15, projects from between the upper and lower gates 62 and 61, and is fed to between the pair of feed rollers 22a and 22b. In this time, the drive motor 66 is stopped. Thereafter, the IC card Pa is drawn out from the hopper 12 and fed forwards by the pair of feed rollers 22a and 22b. Meanwhile, the pusher 15 stands by at the pushing position until the IC card Pa is completely drawn out.

Upon drawing the lowest IC card Pa, a part of the weight of the other IC cards P layered on the IC card Pa is born by the second stage 82 of the pusher 15 and the load is thus diffused. Therefore, the load which acts on the IC card Pa at the lowest end, which projects outside from the card outlet port 58, is reduced, so that the resistance applied to the IC card Pa when this card Pa is drawn by the pair of feed rollers 22a and 22b is reduced in comparison with a conventional apparatus. As a result, the IC card Pa can be easily pulled out.

When the lowest IC card Pa is fed out, the leading end portion of a second IC card Pb is brought into contact with the lower gate 61 due to its dead weight. In this state, the drive motor 66 is driven again, and the pusher 15 is moved in the direction toward the initial position. Further, at the time point when the pusher 15 is moved to the vicinity of the initial position, the rear end portion of the IC card Pb slides from the second stage 82 of the pusher 15 over the slanting surface 83 and the push surface 80, and falls down on the first stage 74, to return to the initial state.

The weight 84 is set on the IC card Pc layered at the uppermost end in the hopper 12. Thus, even when the IC card Pc is pushed by the pusher 15, this card is prevented from being away from the pushing surface 80, as in other cards.

According to the card issuing apparatus constructed in the above structure, the head body 32 of the head unit 18 is pushed by an IC card P being conveyed and is moved thereby continuously between the standby position, the connect position, and the discharge position. Thus, the contact pins 36 can be brought into contact with the IC card and can be made apart therefrom without using an independent drive source such as a solenoid, a motor, or the like to drive the head body 32. Besides, the head body 32 can be moved in synchronization with the movement of the IC card P, and therefore, a sensor or the like for detecting the moving timings of the head body need not be provided. Further, since the IC card is moved, kept in contact with the head body, the head body and the IC card can be easily aligned with each other at a high accuracy, so that any particular sensor or control means is not required. Accordingly, the apparatus can made simple in structure and low in cost. In addition, since the head body is rapidly and automatically returned to the initial position immediately after the IC card P passes over the head body 32, the entire apparatus achieves high speed continuous operation.

In addition, according to the card supply device 10 constructed as described above, when an IC card Pa at the lowest end is pushed by the pusher 15, a part of the total weight of the other remaining IC cards in the hopper 12 is bared by the second stage 82 of the pusher 13. Therefore, it is possible to reduce the resistance generated when the IC card Pa layered at the lowest end and projecting from the card outlet port 58 is drawn from the hopper 12 by a pair of feed rollers 22a and 22b, in comparison with a conventional apparatus, so that the IC card Pa can be pulled out with a light force even before the IC card Pa is completely discharged from the hopper 12. As a result of this, IC cards can be easily supplied, one after another, without particularly reducing the number of stacked IC cards P contained in the hopper 12.

In addition, since the load which acts on the IC card Pa at the lowest end is reduced, it is possible to reduce the friction to be generated between the IC card Pa and another IC card Pb layered thereon when the IC card Pa is pulled out, and damages on the surfaces of the IC cards can be reduced.

Further, it is not necessary to keep pushing the IC card Pa by the pusher 15 until the entire IC card Pa projects to the outside of the hopper 12, when the IC card Pa is pushed out of the hopper 12 through the card outlet port 58. Therefore, the movement stroke of the pusher 15 can be shortened. Besides, a small drive power can sufficiently serve as a drive motor 66 or any other drive means such as a solenoid, for driving the pusher 15. As a result, the card supply device can be down-sized, so that the entire card issuing apparatus can have a small size.

FIG. 13 shows a card issuing apparatus according to a second embodiment of the present invention. With the second embodiment, the structure of the support mechanism 34 for supporting the head body 32 is different from that of the first embodiment described above.

Specifically, the support mechanism 34 has a pair of opposing support frames 42 (only one of which is shown in the figure) arranged in parallel with each other with a predetermined distance. A pair of guide slots 90 and 91 are formed in each support frame 42. The head body 32 is arranged between the pair of support frames 42, and has guide pins 92 and 93 respectively engaged in the guide slots 90 and 91 such that the guide pins can freely slide in the slots. As a result, the head body 32 is supported by the pair of support frames 42 to be movable along the guide slots 90 and 91.

The guide slot 90 has a horizontal portion 90a extending in parallel with the feeding path 14 of the IC card P, and slanting portions 90b and 90c extending obliquely upwards from both ends of the horizontal portion 90a. Likewise, the guide slot 91 has a horizontal portion 91a and a pair of slanting portions 91b and 91c.

A tension spring 46 as returning means is stretched between the head body 32 and the support frames 42, and is positioned between the head body 32 and the card supply device 10. Note that the structures of the other portions of the second embodiment are the same as those of the first embodiment. The portions of the second embodiment which are the same as those of the first embodiment are referred to by common reference numerals, and detailed explanation of those portions will be omitted here from.

According to the second embodiment constructed as described above, the head body 32 is urged toward the card supply device 10 side by the tension spring 46 and is maintained in a standby position, while the apparatus is not operating. In the standby position, the guide pins 92 and 93 are respectively positioned in the slanting portions 90b and 91b of the guide slots 90 and 91, and the contact pins 36 of the head body 32 are kept apart from the feeding path 14.

An IC card P supplied from the card supply device 10 is fed along the feeding path 14, and the leading end of the card P abuts against the abutting surface 32b of the head body 32. Then, the head body 32 is pushed by the IC card P and moves to the left side in the figure. Since the guide pins 92 and 93 of the head body 32 move along the guide slots 90 and 91 provided in the support frames 42, the head body 32 comes close to the IC card P while moving to the left side. As a result of this, the lower ends of the contact pins 36 of the head body 32 are pushed against the connect terminals 20 of the IC card P.

When a card sensor 28 detects the leading end of the IC card P, the pair of feed rollers 22a and 22b are stopped, and the IC card P and the head body 32 are stopped in the connect position. In this state, communication, i.e., information reading or writing is carried out between the head body 32 and the IC card P through the connect terminals 20 and the contact pins 36.

Upon completion of the communication, the feed rollers 22a, 22b, 24a, and 24b are driven again to move the IC card P in the direction to the left side in the figure. Accordingly, the head body 32 is moved in the direction to the left side, too. Here, the guide pins 92 and 93 of the head body 32 respectively move along the slanting portions 90c and 91c of the guide slots 90 and 91. As a result, the head body 32 moves obliquely upwards to the discharge position, and is moved apart from the feeding path 14 and the IC card P.

Thereafter, the IC card P is further conveyed forwards by the pair of feed rollers 24a and 24b, and is discharged out of the apparatus. Thereafter, the head body 32 is urged by the tension spring 46 toward the card supply device 10 side, and is returned to the standby position.

In the second embodiment constructed as described above, the same advantages as in the first embodiment can be obtained.

Figure 14:
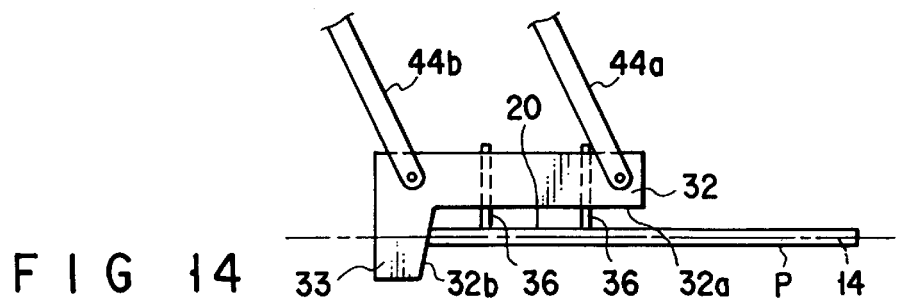
FIG. 14 is a side view showing a modification of an abutting surface of the head body.

Note that the abutting surface 32b of the head body 32 may be formed to be slanted from the bottom surface 32a toward the discharge port side, as shown in FIG. 14. In this case, when the projecting portion 33 of the head body 32 is moved in the direction in which the projecting portion 33 is brought into contact with and is made apart from the IC card P, the contact position between the connect terminals 20 and the contact pins 36 are slightly shifted, so that the electric contact between the connect terminals and the contact pins is secured more steadily by a rubbing action therebetween.

Figure 15:
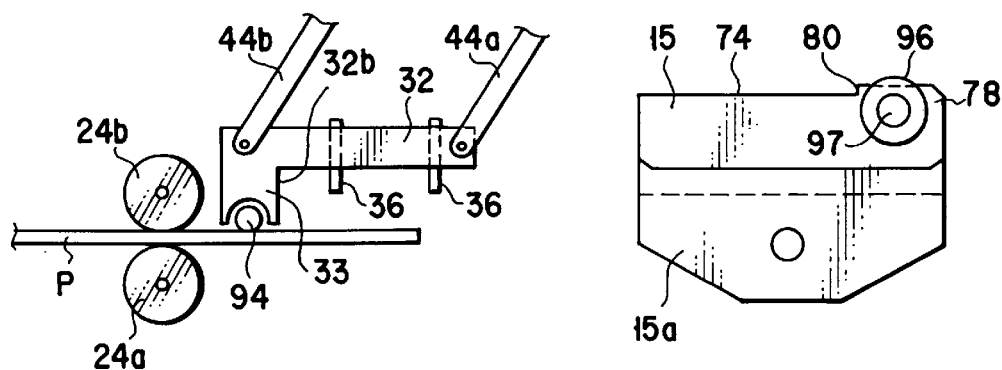
FIG. 15 is a side view showing another modification of the head body.

In addition, it is possible to adopt a structure in which a guide roller 94 is provided at an extended end of the projecting portion 33 of the head body 32, as shown in FIG. 15. In this case, when the IC card P passes below the projecting portion 33, the guide roller 94 rolls on the upper surface of the IC card, so that the upper surface of the IC card P is prevented from being damaged by the projecting portion 33.

In the embodiments as described above, if communication between an IC card P and the head body 32 ends in a short communication time, the IC card P need not be stopped at the connect position, and therefore, the processing speed of the apparatus can be improved. Also, in the above embodiments, it is possible to adopt a structure in which the hopper 12 is detached from the card supply device and IC cards are inserted manually by hands. In this case, the IC cards can be easily returned back to the insertion port side, by inversely rotating the feed rollers 22a and 22b.

Figure 16:
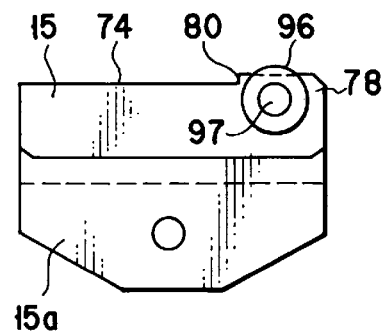
FIG. 16 is a side view showing a modification of the pusher.

In addition, the support portion of the pusher 15 may be arranged in a structure as shown in FIG. 16, in the card supply device 10. In this structure, the supporting portion is constituted by a support roller 96 in place of the second stage 82 and the slanting surface 83 of the pusher 15 used in the above embodiments.

A support shaft 97 of the support roller 96 is provided at the pusher 15 in the following condition. In the vertical direction, the support roller 96 extends to a level lower than a level equivalent to the thickness of two IC cards P set on the first stage 74 of the pusher 15. In the horizontal direction, the support roller 31 is provided at a position in which the support roller 31 does not contact with the IC card Pa at the lowest end which is to be pushed out by the pusher 15.

Even in the case of using the pusher 15 having the support roller 96 as described above, the roller 96 supports the other IC cards remaining in the hopper 12 than the IC card Pa at the lowest end which is to be pushed out by the pushing surface 80 of the pusher 15, during the pushing operation of the pusher 15. As a result, it is possible to prevent the entire weight of the remaining IC cards P layered on the IC card Pa from acting on the IC card Pa, like in the first embodiment. Thus, the resistance applied when the IC card Pa is pulled out from the hopper 12 can be reduced.

In addition, the contact resistance between the IC card Pa at the lowest end of the hopper 12 and the remaining IC cards P can further be reduced by the support roller 96. Therefore, damages on IC cards caused by movements of the pusher 15 can be prevented more effectively.

Figure 17A:
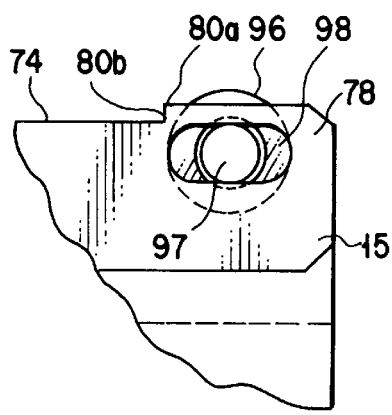
FIGS. 17A and 17B are enlarged side views showing a support roller portion according to the modification shown in FIG. 16.
Figure 17B:
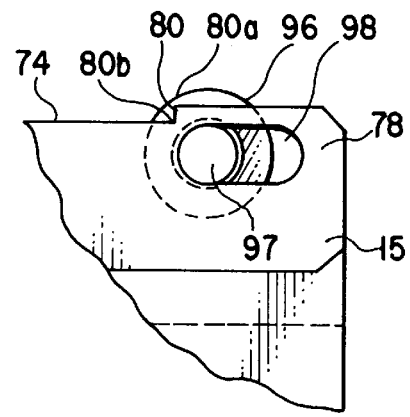

In the case of using the support roller 96, a bearing hole 98 formed in the pusher 15, in which the support shaft 97 of the roller is inserted, may be formed as an elongated hole extending in the moving direction of the pusher 15, as shown in FIGS. 17A and 17B.

As shown in FIG. 17B, the front end portion of the bearing hole 98 extends to a predetermined position, such that at least a part of the outer circumferential surface of the support roller 96 projects over the upper end 80a of the pushing surface 80 to the card discharge side when the pusher 15 moves from the discharge position to the initial position. In addition, the rear end of the bearing hole 98 extends to a predetermined position such that the outer circumferential surface of the support roller 96 can be positioned behind a cross point 80b where the first stage 74 crosses the pushing surface 80, as shown in FIG. 17A.

In the case of using the pusher 15 comprising the bearing hole 98 with the above-mentioned structure, operation will be as follows. When the IC card Pa at the lowest end is pushed, the support roller 96 is pushed by the IC card Pb layered on the IC card Pa, and the support shaft 97 is moved in the direction toward the rear end portion, as shown in FIG. 17A. Therefore, the support roller 96 is maintained, with its outer circumferential surface positioned closer to the rear end of the pusher 15 than the cross point 80b where the first stage 74 crosses the pushing surface 80. In this state, the support roller 96 supports the second and higher IC cards P.

When the pusher 15 is returned from the discharge position to the initial position, the support roller 96 is moved until the support shaft 97 abuts against the front end of the bearing hole 98, as shown in FIG. 17B. Therefore, the support roller 96 is maintained with at least a part of its outer circumferential surface positioned closer to the discharge side than the upper end 80a of the pushing surface 80. As a result, at the time point when the pusher 15 is returned to the vicinity of the initial position, the rear end portion of the IC card Pb falls down on the first stage 74, with this rear end portion kept in contact with the support roller 96, and the initial state is thereby recovered. Therefore, it is possible to prevent the rear end portion of the IC card Pb from being brought into contact with the upper end 80a of the pushing surface and from being damaged thereby.

Figures 18A, 18B:
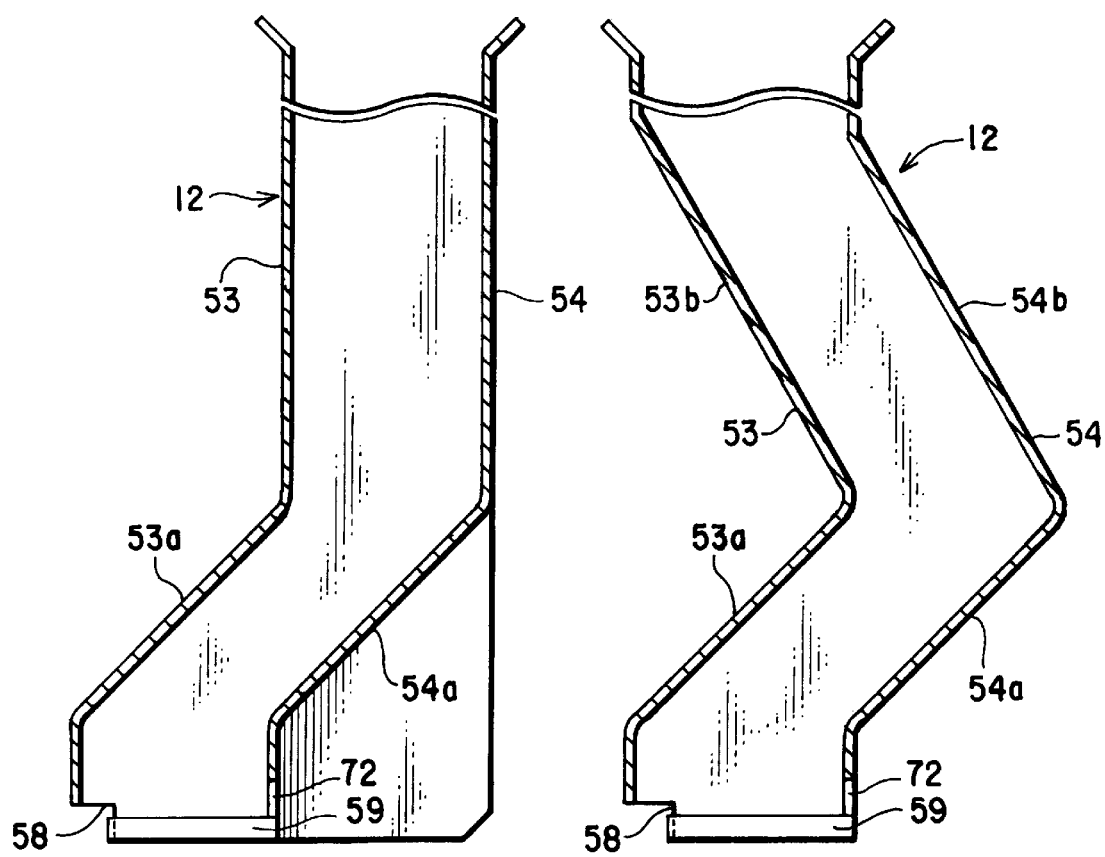
FIG. 18A is a cross-sectional view showing a modification of the hopper of the card supply device.
FIG. 18B is a cross-sectional view showing another modification of the hopper of the card supply device.

In addition, the hopper 12 of the card supply device 10 is not limited to a shape like a square pillar extending vertically, but may be arranged as shown in FIG. 18A or 18B.

According to the hopper shown in FIG. 18A, lower portions of the front plate 53 and the rear plate 54 are constituted by slanting plates 53a and 54a slanted with respect to the vertical direction, and a part of the load of the IC cards P situated in an upper region of the hopper 12 is supported by the slanting plate 54a. In this case the load applied to the IC card at the lowest end in the hopper can be reduced, and IC cards can be supplied more easily.

According to the hopper 12 shown in FIG. 18B, upper portions of the front plate 53 and the rear surface plate 54 are constituted by slanting plates 53b and 54b slanted to the side opposite to the slanting plates 53a and 53b. In this case, the load of the IC cards in the hopper 12 can be partially supported by the slanting plate 53b in the upper portion side, and the load applied to the IC card at the lowest end can be reduced much more.

Note that the present invention is not limited to the above-mentioned embodiments, but can be variously modified within the scope of the present invention. For example, the present invention is not limited to an IC card issuing apparatus as described above, but can be applied to a processing apparatus for processing another kind of card such as a magnetic card or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card processing apparatus comprising:
  card supply means for sequentially supplying a card having a connect terminal;
  feeding means for feeding the card supplied by the card supply means, along a predetermined feeding path;
  a head unit including an abutting portion for abutting against a leading end of the card being fed by the card feeding means, and a contact element for bringing into contact with the connect terminal of the card, the head unit being movable between a standby position in which the abutting portion is located in the feeding path and the contact element is apart from the feeding path, a connect position in which the abutting portion is located in the feeding path and the contact element brings in contact with the connect terminal of the card being fed so as to perform predetermined information processing on the card, and a discharge position in which the abutting portion and the contact terminal are moved apart from the feeding path, such that the leading end of the card being fed by the card feeding means pushes the abutting portion of the head unit and moves the head unit from the standby position to the discharge position through the connect position; and means for returning the head unit from the discharge position to the standby position.

2. A card processing apparatus according to claim 1, wherein the head unit includes a head body having the abutting portion and the contact element, and support means for supporting the head body to be movable between the standby position, the connect position, and the discharge position, along an arcuated moving path crossing the feeding path.

3. A card processing apparatus according to claim 2, wherein the support means includes a support frame, and a plurality of support arms each having an end rotatably connected with the support frame and another end rotatably connected with the head body.

4. A card processing apparatus according to claim 1, wherein the head unit includes a head body having the abutting portion and the contact element, and support means for supporting the head body to be continuously movable between the standby position, the connect position, and the discharge position, the support means comprising a support frame having a guide slot, and a guide pin provided on the head body and engaged in the guide slot to be slidable in the guide slot.

5. A card processing apparatus according to claim 1, wherein the abutting portion includes a slanting surface inclined toward the discharge position with respect to a direction perpendicular to the feeding path, for generating a relative movement between the card and the abutting portion when the leading end of the card abuts against with the slanting surface.

6. A card processing apparatus according to claim 1, wherein the head unit includes a guide roller which is provided adjacent to the abutting portion and rolls over a surface of the card in the discharge position of the head unit.

7. A card processing apparatus according to claim 1, wherein the head unit comprises a head body including the abutting portion and the contact element, and the contact element includes a contact pin extending from the head body and supported on the head body to be movable in a direction perpendicular to the feeding path, and an urging member for urging the contact pin toward the feeding path.

8. A card processing apparatus according to claim 2, further comprising detect means for detecting the head unit having moved to the connect position in accordance with movement of the card; and control means for selectively stopping the feeding of the card by the card feeding means when the head unit having moved to the connect position is detected by the detect means.

9. A card processing apparatus according to claim 1, further comprising detect means for detecting the head unit having moved to the connect position in accordance with movement of the card; and control means for selectively stopping feeding of the card by the card feeding means when the head unit having moved to the connect position is detected by the detect means, and for further feeding the card by the card feeding means after the information processing by the head unit is completed.

10. A card processing apparatus according to claim 1, wherein the card supply means comprises a hopper storing a plurality of stacked cards and having a lower end portion which is provided with a card outlet port for allowing only a lowest card to pass among the plurality of stacked cards, card pushing means having a card pushing portion with a thickness smaller than a thickness of each of the cards, for pushing out the lowest card in the hopper through the card outlet port, and card support means provided on the card pushing means, for supporting cards other than the card pushed out by the card pushing portion, which remain in the hopper, during the card pushing portion is pushing out the lowest card.

11. A card processing apparatus according to claim 10, wherein the card support means includes a card support portion provided on the card pushing means and positioned at a level higher than at least the thickness of the lowest card in the hopper, and a slanting surface connecting an upper edge of the pushing portion and the card support portion.

12. A card processing apparatus according to claim 11, wherein the card support portion is positioned at a level lower than a thickness of two cards, one of which is the lowest card in the hopper and another one of which is a card layered thereon.

13. A card processing apparatus according to claim 10, wherein the support means has a support roller rotatably provided on the card pushing means and positioned at a level higher than a thickness of the lowest card in the hopper, for supporting the cards other than the lowest card, which remain in the hopper, during the card pushing portion is pushing out the lowest card.

14. A card processing apparatus according to claim 13, wherein the support roller is positioned at a level lower than a thickness of two cards, one of which is the lowest card in the hopper and another one of which is a card layered thereon, and at a position where the support roller does not interfere with the card to be pushed out by the card pushing portion.

15. A card processing apparatus according to claim 14, wherein the card support means comprises roller moving means for maintaining the support roller at a level lower than the thickness of the two cards, one of which is the lowest card in the hopper and another of which is the card layered thereon, for maintaining the support roller at an escape position in which the support roller does not interfere with the card to be pushed out by the card pushing portion while the card push portion is pushing the lowest card, and for moving the support roller such that at least a part of the support roller projects in a direction in which the lowest card is pushed, over the position of an upper end of the card pushing portion, when the card pushing portion moves from a pushing position to an initial position where the card pushing portion faces the lowest card in the hopper.

16. A card processing apparatus according to claim 10, wherein the hopper includes a slanting plate which is inclined so as to receive a load of the cards layered in the hopper.

17. A card processing apparatus according to claim 10, wherein the card pushing means comprises a pusher movable in a direction substantially parallel to the surfaces of the cards layered in the hopper, and drive means for moving the pusher, the pusher includes a first stage positioned substantially parallel to the surfaces of the cards, for mounting a part of the lowest card in the hopper, and a projecting portion projecting from an end portion of the first stage, the card pushing portion includes a pushing surface formed on the projecting portion and extending in a direction substantially perpendicular to the first stage, and the support means includes a second stage extending to be substantially parallel to the surfaces of the cards, the second stage being positioned at a level higher than the first stage, by a distance greater than a thickness of the lowest card and smaller than a thickness of two cards, one of which is the lowest card and another of which is a card layered thereon.

18. A card processing apparatus according to claim 10, wherein the card feeding means includes a pair of feed rollers for clamping the leading end portion of the card pushed out from the hopper by the card pushing means, and for drawing out the card from the hopper to feed the card into the feeding path.

19. A card processing apparatus for writing information on and reading information from a card which is provided with a connect terminal on a surface of the card, the apparatus comprising:

feeding means for feeding the card along a predetermined feeding path;

a head unit having an abutting portion for abutting against a leading end of the card being fed by the feeding means, and a contact element for contacting with the connect terminal of the card so as to write information on and read information from the card, the head unit being arranged at a standby position wherein the abutting portion is located in the feeding path and the contact element is spaced apart from the feeding path;

support means for supporting the head unit in such a manner that the head unit is moved in a feeding direction of the card when the leading end of the card being fed by the feeding means abuts against the abutting portion and pushes the head unit, the head unit is moved toward the surface of the card in accordance with the movement of the head unit so that the contact element brings into contact with the connect terminal of the card, and the head unit is spaced from the surface of the card and the abutting portion is removed from the leading end of the card when the card is further fed by the feeding means; and a returning member for returning the head unit to the standby position after the abutting portion of the head unit is removed from the leading end of the card.

\* \* \* \* \*